United States Patent [19]

Biethan, Sr.

[11] 4,142,091
[45] Feb. 27, 1979

[54] PORTABLE ELECTRIC WELDER

[76] Inventor: John D. Biethan, Sr., 2785 SW. 192nd Ave., Aloha, Oreg. 97005

[21] Appl. No.: 755,455

[22] Filed: Dec. 30, 1976

[51] Int. Cl.² .......................................... B23K 9/00
[52] U.S. Cl. ................................. 219/130.1; 361/384
[58] Field of Search .......... 219/131 R, 131 WR, 135, 219/130.1; 323/24; 174/16 R; 361/384

[56] References Cited

U.S. PATENT DOCUMENTS

| | | | |
|---|---|---|---|
| 3,059,164 | 10/1962 | Johnson | 219/131 R |
| 3,308,340 | 3/1967 | Gille et al. | 219/131 R |
| 3,493,848 | 2/1970 | Galloway | 323/24 |
| 3,567,902 | 3/1971 | Stearns et al. | 219/131 R |
| 3,648,437 | 3/1972 | Bridges | 323/24 |
| 4,027,206 | 5/1977 | Lee | 174/16 R |

FOREIGN PATENT DOCUMENTS

| | | | |
|---|---|---|---|
| 2130324 | 12/1972 | Fed. Rep. of Germany | 219/131 R |
| 1317893 | 5/1973 | United Kingdom | 219/131 R |

OTHER PUBLICATIONS

D. N. Lapedes, Ed., *McGraw-Hill Dictionary of Scientific & Technical Terms*, 1974, p. 1507.

*Primary Examiner*—J. V. Truhe
*Assistant Examiner*—Clifford C. Shaw
*Attorney, Agent, or Firm*—Eugene M. Eckelman

[57] ABSTRACT

An electric welding apparatus designed for light arc welding work and specifically made of small size and lightweight for one man portability. To accomplish these functions, the welder uses a circuitry which converts standard 117 volt AC line power to low voltage DC current and uses a control circuit incorporating a triac as a phase control on the primary side of the transformer. The apparatus is enclosed in a casing for easy transportation by one person and employs a novel spacing of elements therein for cooling by forced air circulation.

2 Claims, 5 Drawing Figures

U.S. Patent  Feb. 27, 1979  4,142,091
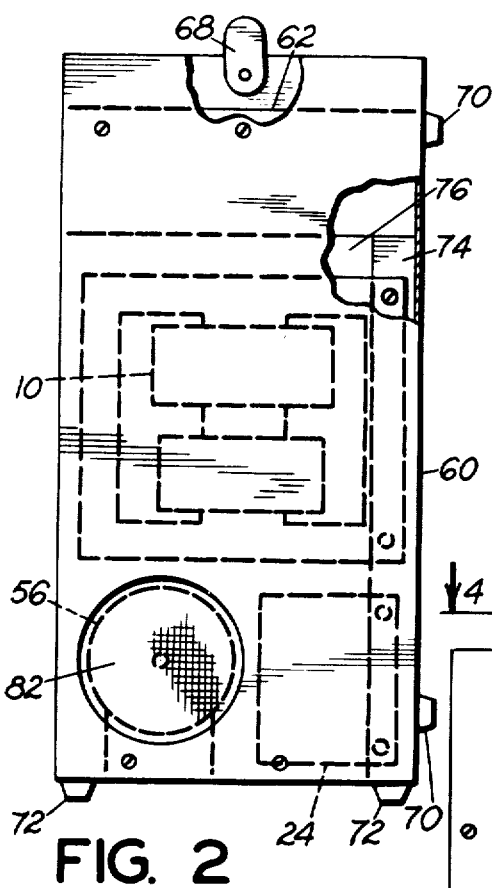
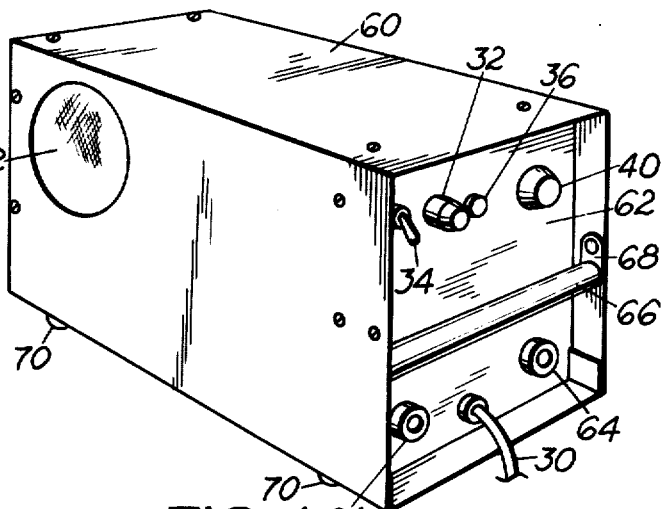
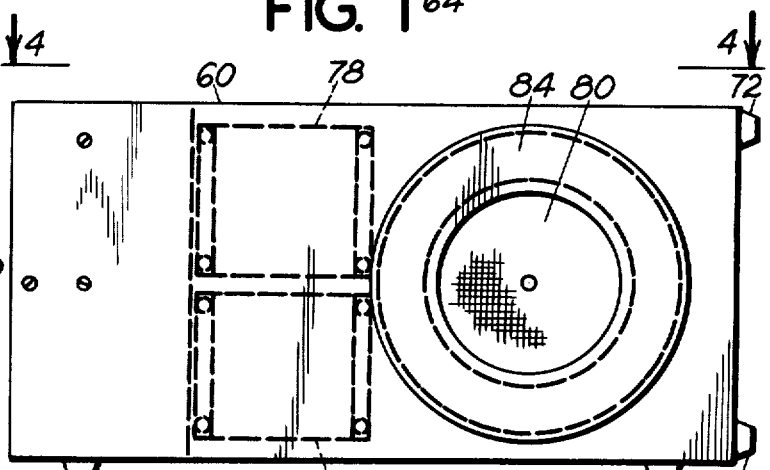
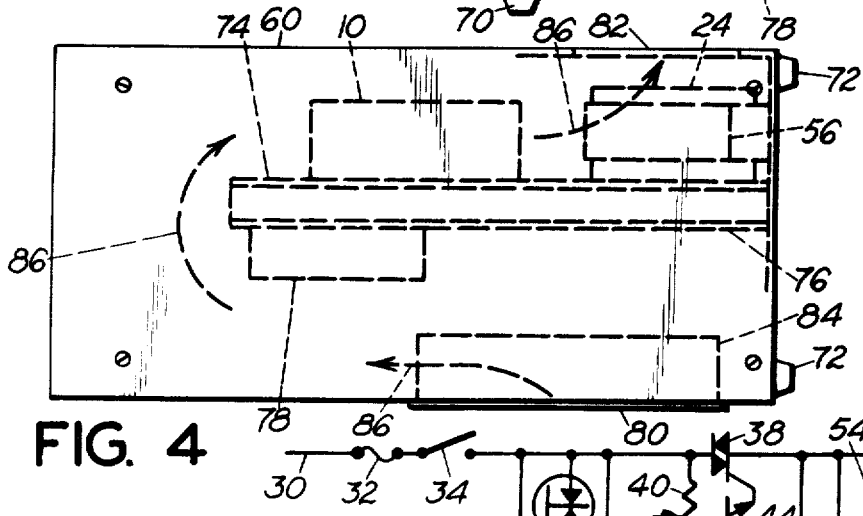
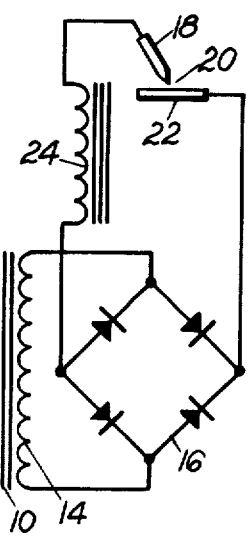

PORTABLE ELECTRIC WELDER

BACKGROUND OF THE INVENTION

This invention relates to new and useful improvements in electric welders.

Electric welding apparatuses heretofore employed which use either the tungsten inert gas or carbon arc procedures are designed to handle a variety of welding jobs, such as for example jobs which require welding of both light and heavy gauge metals, and in order to perform this wide range of welding functions, such apparatuses have been of large physical size and heavy weight. Much of this bulkiness is a result of heavy transformers and heavy choke controls on the secondary side of the transformer. These apparatuses weigh at least 150 pounds, and such comprises a serious disadvantage in that they are not readily portable to a great many job sites at which their use is required, at least conveniently by a single workman. Thus, the present cost of performing a small welding job in a commercial kitchen for example is very high since it is necessary either to transport the bulky welding apparatus to the job site or remove the work to be welded and take it to the shop. Also, prior apparatuses in order to weld the heavy gauge metals or to accomplish other heavy duty welds require a high amperage output which in turn requires at least an input of 230 volts at 50 amps. This of course also limits the use of the heavy welding equipment because not all job sites have a 230 volt supply.

SUMMARY OF THE INVENTION

According to the present invention and forming a primary objective thereof, an electric welding apparatus is provided which by its specific structure and circuitry is small in size and weight so as to be readily portable by a single workman, and in addition such apparatus operates in an efficient manner.

To accomplish the above objectives, the welding apparatus employs a casing with handle grip means thereon for carrying by a single workman. The circuitry employed uses standard 117 volt 20 amp AC line power as the input and converts such line power to low voltage DC through the medium of a control circuit incorporating a triac as a phase control on the primary side of a transformer which is interposed between the input and a rectifier. The triac serves as an input control and eliminates heavy electrical components heretofore employed principally on the secondary side of the transformer. The internal components are compactly supported and arranged in the casing and are associated with circulating means including a fan for forced cooling.

The invention will be better understood and additional objects and advantages will become apparent from the following description taken in connection with the accompanying drawings.

BRIEF DESCRIPTION OF THE DRAWINGS

FIG. 1 is a perspective view of an electric welder employing features of the present invention, this view showing the welder in horizontal position;

FIG. 2 is a side elevational view of the welder but showing it stood on end, this view being partly broken away to show internal structure;

FIG. 3 is a side elevational view taken from the opposite side of FIG. 1;

FIG. 4 is a plan view taken on the line 4—4 of FIG. 3; and

FIG. 5 is a schematic diagram of the circuit arrangement for the present welder.

DETAILED DESCRIPTION OF A PREFERRED EMBODIMENT

Referring first to FIG. 5, a circuitry for the present welder comprises a transformer 10 having a primary side 12 and a secondary side 14. Such transformer preferably is of the loosely coupled type and has a 117 volt primary and a 45 volt 50 amp secondary. The secondary circuit includes a rectifier bridge 16 whose input terminals are tied across the secondary winding 14 of transformer 10. One of the output terminals of the rectifier bridge is connected to an electrode 18 of a welding head using either T.I.G. (tungsten inert gas) or carbon arc mode. The electrode is shown spaced across a gap 20 from a workpiece 22 to which the other output of the rectifier bridge is arranged to be connected. An inductor 24 is in the circuit to the electrode 18 and serves to smoothen the DC output as well as to limit to some extent the maximum output of the unit.

The primary side 12 of the transformer is connected to input lines 30 of an alternating current supply such as a conventional 117 volt supply circuit. A fuse 32 and an on/off control switch 34 are provided in one of the input lines. An indicator pilot light 36 is connected in the circuit.

Important to the invention, the control circuit for the transformer to vary the output for the electrode 18 comprises a triac 38 in one of the input lines.

Operation of the triac 38 for variance of its conduction angle is accomplished by a relaxation oscillator which includes a variable resistor 40 or similar control, a resistor 42 in the control circuit with a diac 44, and a pair of capacitors 46 and 48, the capacitor 46 being in series with resistor 42 and the capacitor 48 being in parallel with the resistor. The triac 38 is used to alter the sine wave shape of alternating current by blocking current flow until a small voltage is applied to its gate terminal, whereupon, it will conduct fully until the AC voltage across its main terminals crosses the zero point, at which time it will then again block current flow until next turned on by the small signal voltage applied to its gate. In effect, this then is a voltage control reducing the average input voltage to the transformer, which in turn reduces the output voltage of the transformer. The control of the voltage on the primary side of the transformer has been found to eliminate heavy and costly circuit components on the secondary side of the transformer to substantially reduce the weight of the unit.

In the welding art, current is the electrical factor which produces the necessary heat to produce a molten weld pool, and therefore, current being a function of voltage at a fixed resistance, the current at the electrode is attenuated by the above circuitry. Operation of the triac 38, for variance of its conduction angle, and thus its effective average voltage attenuation is accomplished through the use of a bilateral trigger diode comprising the diac 44 which blocks current flow at voltages below 30 volts, and conducts at higher voltages, known as the breakover voltage. The circuitry to power and time the breakover of the diac trigger diode 44 is embodied in the capacitor 48, charged through the variable resistor 40 and discharged through resistor 42 and the diac trigger diode 44 to the breakover voltage of the diac. Timing is controlled by the resistance setting of the variable resistor 40 to control current flow. Capacitor 46 suppresses radio frequency interference which can be generated by the diac.

Also included in the circuitry are a pair of thyrectors 50 and 52. These thyrectors are connected in parallel relation across the circuit one on each input and output side of the triac and serve to clamp and limit any internal or external transient voltage to safe levels of operation for the triac and diac. A resistor 54 is connected across the circuit on the output side of the triac and serves as a bleeder and permanent load on the triac to provide a constant function of the latter. A fan motor 56 is also connected in the circuit and is in constant operation as long as the circuit is actuated.

With particular reference to FIGS. 1 through 4, the welder comprises a casing 60 having a recessed front end wall 62 comprising a panel surface for supporting pilot light 36, fuse 32, control switch 34, a control knob for variable resistor 40, a connection for input lines 30, and plug-in adapters 64 for the electrode and workpiece lines. A handle 66 is contained within the recess and arms 68 on the ends of the handle are pivotally connected to the sides of the recessed end whereby the handle can be swung out for use or swung in to be out of the way.

The casing 60 may be supported horizontally as shown in FIG. 1 or in an upended position as shown in FIG. 2, and for this purpose the bottom wall and one end wall of the casing have rubber feet 70 and 72, respectively. The bottom wall of the casing has a longitudinal low profile bracket 74 to which the transformer 10 is integrally secured. Also secured to this bracket is the inductor 24. Depending from the top wall of the casing in integral relation therewith and to one side of the transformer 10 and inductor 24 is a baffle 76 which extends the full height of the casing. This baffle extends from the rearward end of the casing to a point short of the front end to provide an air passageway at such front end. Secured to the baffle 76 on the side opposite from the transformer 10 are heat sinks 78 which contain the diodes of the rectifier bridge. Other components in the circuit may be mounted on or adjacent to the inner surface of front panel 62.

The fan motor 56 is secured in the casing adjacent the rearward end of the latter and pulls air in through an opening 80 on the opposite side of the casing and discharges it out an opening 82 in the casing. Inlet opening 80 has a filter assembly 84 associated therewith to prevent foreign particles from entering the casing and damaging the inner components. In the operation of the fan and as designated by arrows 86 in FIG. 4, air is pulled in through filtered inlet 80. It flows forward along baffle 76 to cool heat sink 78 and then around the end of the casing to cool components secured to the front panel. Thereupon, the air flows along the other side of the baffle 76 to cool the transformer 10 and inductor 24, and then out the outlet 82.

The structural arrangement of the present welder provides a compact casing for the necessary components and at the same time provides for efficient cooling. The structure utilized as well as the particular circuitry makes the unit sufficiently light in weight and small in size so as to be readily carried by a single workman and at the same time provides for infinite variable control of the welding arc. It can be carried directly to almost any work site and is operable from conventional 117 volt house circuits. Using any T.I.G. equipment, the present welder will weld most ferrous or non-ferrous sheet metals of 14 gage or thinner. It is thus invaluable to the sheet metal industry as an installation and repair tool.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A portable electric welder comprising
   (a) a casing having front and rear end walls, a top wall, a bottom wall, and side walls,
   (b) baffle means in said casing extending between said top and bottom walls and leading longitudinally from said rear end wall to a point just short of said front end wall,
   (c) said baffle means forming an air circulation path on opposite sides thereof,
   (d) air inlet means in said casing disposed on one side of said baffle means adjacent said rear end wall,
   (e) air outlet means in said casing disposed on the other side of said baffle means from said air inlet means adjacent said rear end wall,
   (f) a welding electrode exteriorly of said casing,
   (g) a power supply,
   (h) transformer means mounted in said casing on the same side of said baffle means as said air outlet means,
   (i) said transformer means having a primary winding connected to said power supply and a secondary winding connected in a circuit with said welding electrode,
   (j) rectifier means mounted in said casing on the same side of said baffle means as said air inlet means and being electrically connected in said circuit,
   (k) variable control means mounted in said casing adjacent the inner surface of said front end wall and being connected electrically to the primary side of said transformer,
   (l) said variable control means including a triac controlled by a relaxation oscillator circuit for varying the power output to said welding electrode,
   (m) and fan means in said casing forcing air from said air inlet means to said air outlet means whereby said air circulation path leads from said air inlet means along one side of said baffle means to first cool said rectifier means, then around the end of said baffle means at said front end wall to cool said variable control means, and then along the other side of said baffle means to cool said transformer means.

2. The portable electric welder of claim 1 including a pair of thyrectors connected across said circuit one on each side of said triac for clamping and limiting internal and external transient voltage, resistor means in parallel with said transformer means and in series with said triac serving as a bleeder and permanent load on said triac, said variable control means also including a diac controlling the conduction angle of said triac, capacitor means controlling operation of said diac, and variable resistor means in the circuit of said capacitor for controlling the output to said electrode.

* * * * *